(12) United States Patent
Shinsho et al.

(10) Patent No.: US 7,523,800 B2
(45) Date of Patent: Apr. 28, 2009

(54) SADDLE-TYPE VEHICLE

(75) Inventors: Masami Shinsho, Shizuoka (JP);
Hajime Nakaaki, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 62 days.

(21) Appl. No.: 11/549,012

(22) Filed: Oct. 12, 2006

(65) Prior Publication Data

US 2007/0102896 A1    May 10, 2007

(30) Foreign Application Priority Data

Oct. 17, 2005   (JP)   ............................. 2005-302287

(51) Int. Cl.
*B62D 61/02*   (2006.01)
*B62K 11/00*   (2006.01)
*B62M 7/00*    (2006.01)

(52) U.S. Cl. ...................................... 180/219; 180/227
(58) Field of Classification Search ................. 180/219, 180/220

See application file for complete search history.

(56) References Cited

U.S. PATENT DOCUMENTS

| 4,321,978 | A | * | 3/1982 | Tominaga et al. ........... 180/225 |
| 4,396,084 | A | * | 8/1983 | Yoshimura et al. .......... 180/219 |
| 4,852,678 | A | | 8/1989 | Yamaguchi |
| 4,887,687 | A | * | 12/1989 | Asai et al. .................... 180/219 |
| 4,989,665 | A | * | 2/1991 | Yamagiwa et al. .......... 164/363 |
| 5,375,677 | A | * | 12/1994 | Yamagiwa et al. .......... 180/219 |
| 6,691,814 | B2 | * | 2/2004 | Toyoda ........................ 180/227 |
| 6,889,789 | B2 | * | 5/2005 | Kurayoshi et al. .......... 180/219 |
| 7,240,755 | B2 | | 7/2007 | Iwata et al. |
| 2004/0238254 | A1 | | 12/2004 | Iwata et al. |
| 2006/0197304 | A1 | | 9/2006 | Ishikawa et al. |

FOREIGN PATENT DOCUMENTS

EP      1698548 A1   9/2006
JP      03-031621    5/1991

OTHER PUBLICATIONS

European search report for corresponding European application 06255311.0 lists the references above.

* cited by examiner

*Primary Examiner*—Paul N Dickson
*Assistant Examiner*—Marc A Scharich
(74) *Attorney, Agent, or Firm*—Hogan & Hartson LLP

(57) ABSTRACT

A main pipe of a motorcycle is enhanced in stiffness to stably support an engine. The main pipe includes an intermediate pipe extending above the engine in a longitudinal and substantially horizontal direction, a front pipe extending forwardly downwardly of the engine from a front end of the intermediate pipe, and a rear pipe extending rearwardly downwardly of the engine from a rear end of the intermediate pipe. The rear pipe is curved arcuately in a manner to go around a pivot shaft forwardly downward from a rear side thereof and the engine is connected to a lower end side of the rear pipe.

6 Claims, 4 Drawing Sheets

[Fig. 1]
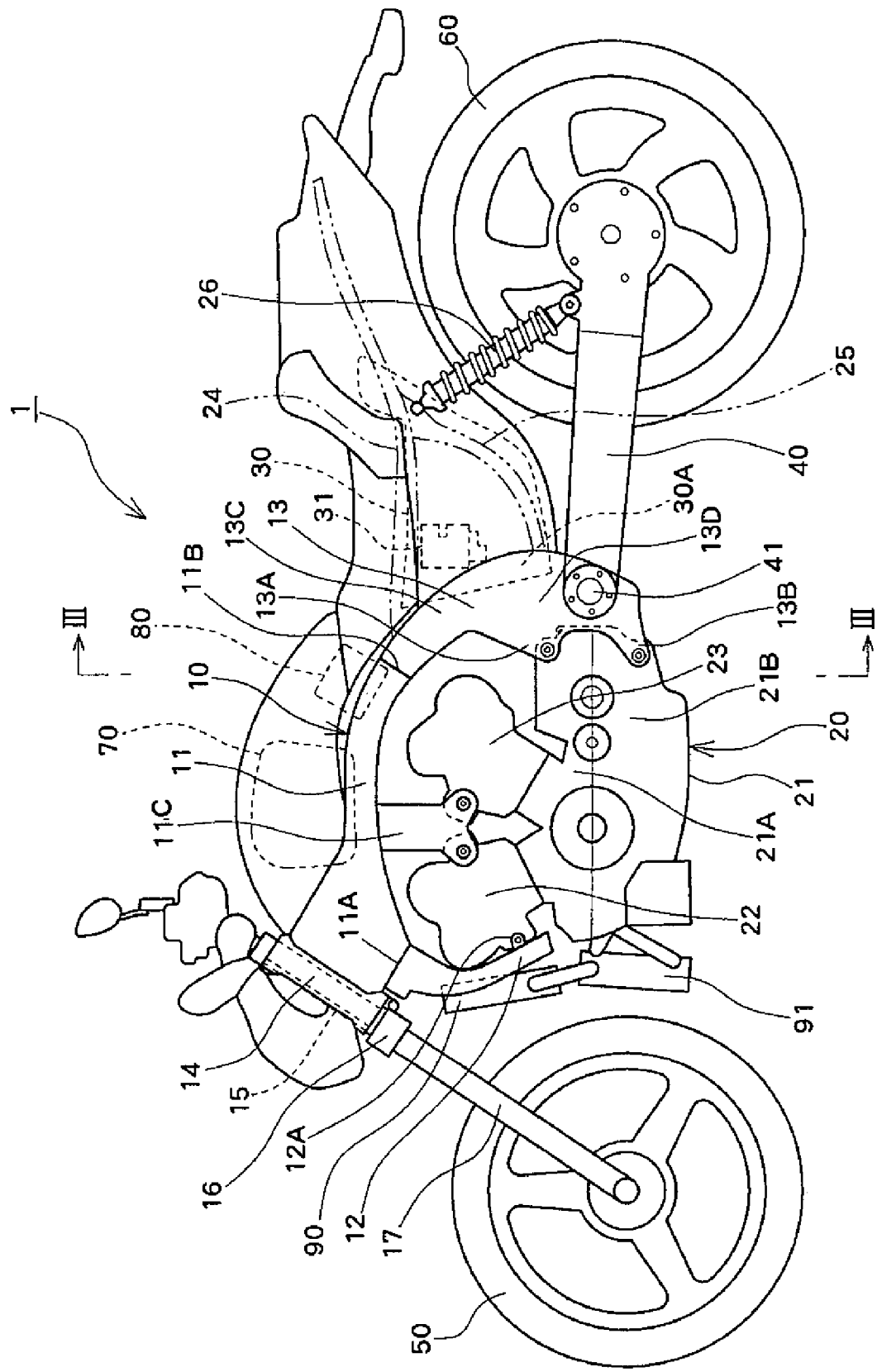

[Fig. 2]
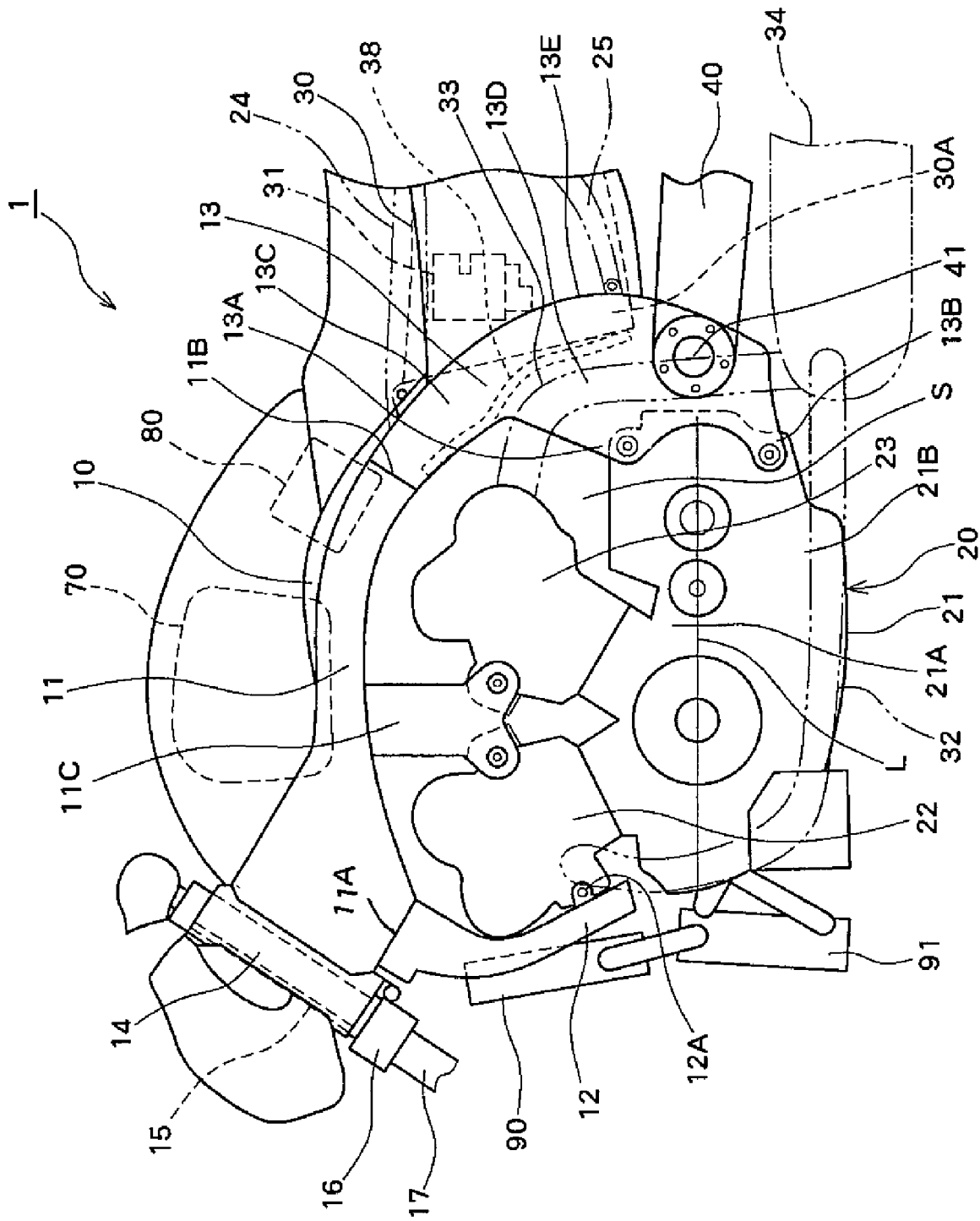

[Fig. 3]
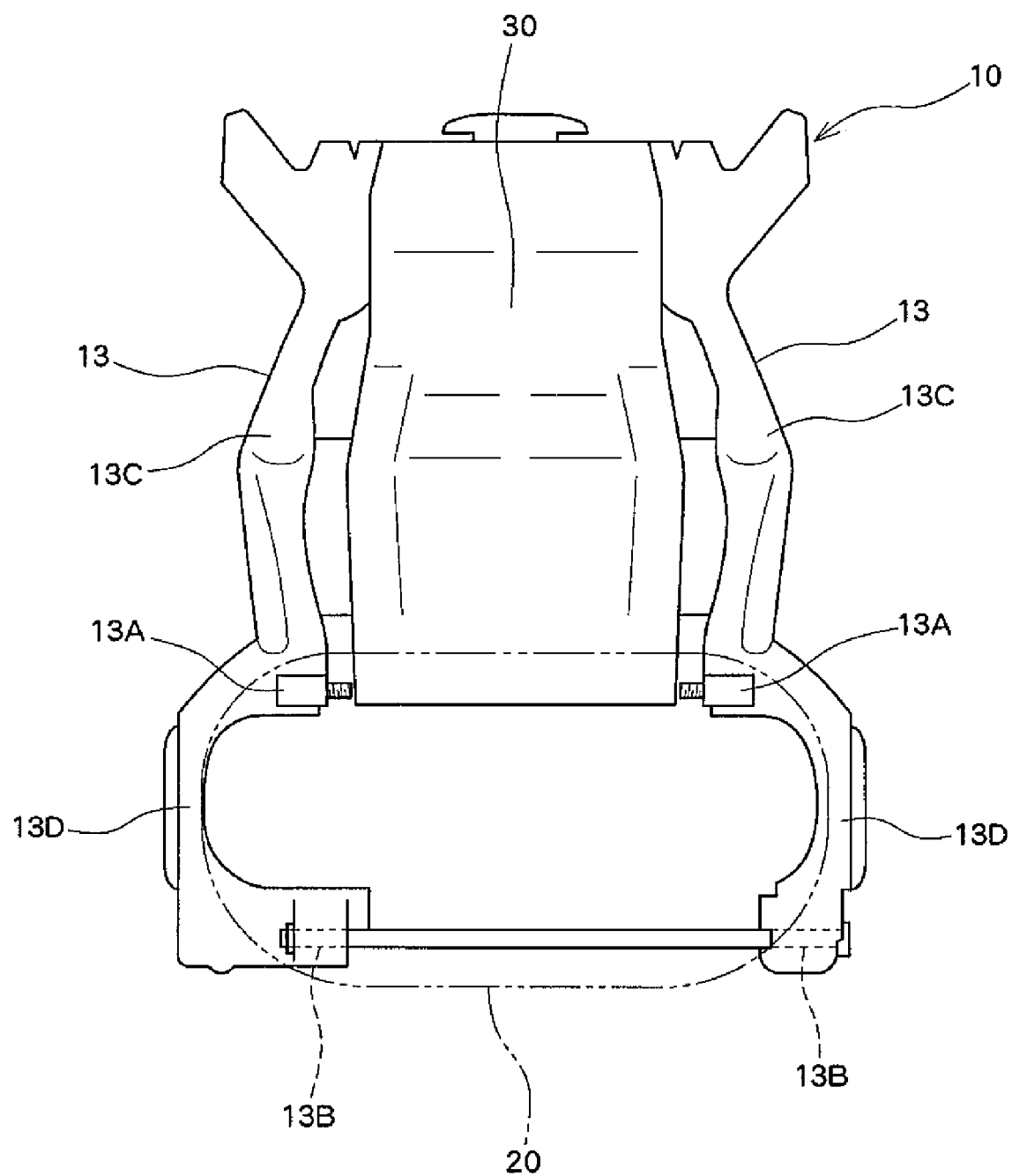

[Fig. 4]
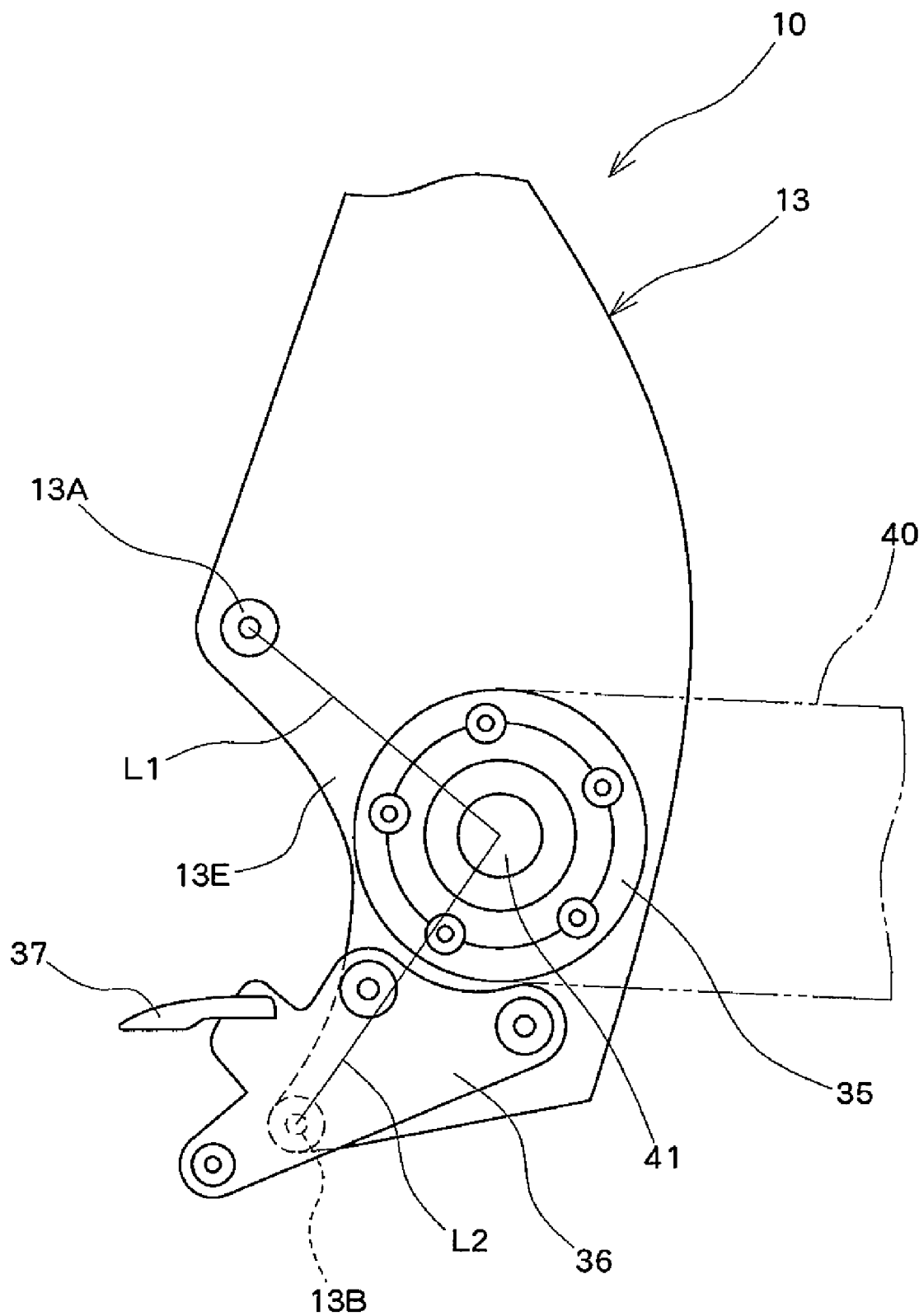

SADDLE-TYPE VEHICLE

RELATED APPLICATIONS

This application claims the benefit of priority under 35 USC 119 of Japanese patent application no. 2005-302287, filed on Oct. 17, 2005, which application is hereby incorporated by reference in its entirety.

BACKGROUND OF RELATED INVENTION

1. Field of the Invention

The present invention relates to a saddle-ride type vehicle such as a motorcycle.

2. Description of Related Art

A conventional saddle-ride type vehicle such as a motorcycle comprises a main pipe of a frame, which constitutes a skeleton of a vehicle body. The main pipe comprises a front pipe extending longitudinally with a rear end thereof bent downward and a rear pipe extending straight downwardly from the rear end of the front pipe (see, for example, JP-B-3-31621).

An engine is typically supported on the main pipe by connecting a front end of the engine to a front end of the front pipe and connecting a rear end of the engine to a lower end of the rear pipe. Thereby, the engine together with the main pipe is used as a rigid member of the vehicle body.

However, the conventional art involves a problem in that a rear end of the front pipe is bent downward substantially in the form of a dogleg, which causes a load from the engine to be locally centered on the bent portion positioned on the rear end of the front pipe. Thus, when the engine is mounted to the main pipe, the stiffness of the main pipe is negatively affected.

Also, since the rear pipe extends substantially straight downwardly from the rear end side (lower end side) of the front pipe, when a rearwardly directed load from the engine is applied on the rear pipe, the load acts as a large moment on the rear pipe extending straight and the load cannot be transmitted smoothly to the whole main pipe, further decreasing the stiffness of the main pipe.

SUMMARY OF THE INVENTION

The invention has been thought of in view of this problem and provides a saddle-ride type vehicle, in which a main pipe is enhanced in stiffness and stably supports an engine.

In order to solve the problem in the related art, the invention provides a saddle-ride type vehicle comprising a main pipe including a front portion extending forward and downward and a rear portion extending rearward and downward. A swing arm is connected to and supported on the rear portion of the main pipe through a pivot shaft to be able to swing. An engine is mounted to at least the front portion and the rear portion of the main pipe. A rear portion of the main pipe comprises a curved portion curved around the pivot shaft forwardly downwardly thereof from rearwardly thereof. A crankcase of the engine is connected to the curved portion of the rear portion of the main pipe.

According to the invention, since the main pipe is curved, when the rear portion of the main pipe is connected to the crankcase, a load from the engine is not locally centered on the main pipe, as in the related art, but instead is uniformly applied to the whole main pipe and the main pipe is thereby enhanced in stiffness. Also, since the main pipe is connected to the crankcase to go around the pivot shaft forwardly downward from rearwardly thereof, in contrast to the conventional art where the rear pipe is extended straight to be directed substantially vertically downward from the rear end of the front pipe to be connected to the crankcase, a load transmitted to the main pipe rearward from the engine is surely born and the main pipe is enhanced in stiffness. Further, since the main pipe covers the engine, the engine can be enhanced in volume.

In one embodiment, a fuel tank is provided rearwardly of the engine and overlaps the curved portion of the rear portion of the main pipe at least partially as viewed in side view. With such construction, the curved portion of the rear portion of the main pipe covers a side of the fuel tank to protect the fuel tank from shock or the like from outside.

In one embodiment, the main pipe comprises left and right main pipes. An interval between the left and right main pipes is larger on a lower side thereof than on an upper side thereof. With such construction, the small interval on the upper side of the left and right main pipes improves a driver's traveling comfort, and the large interval on the lower side provides a fairly large space to accommodate the fuel tank.

In one embodiment, a fuel pump is arranged on a front portion of the fuel tank. With such construction, a load of the vehicle body shared on the front wheel can be set large by the fuel tank, thereby enhancing traveling stability. Also, since the bottom of the fuel tank is inclined forwardly downward to avoid interference when the swing arm swings upward, a fuel pump arranged on the front portion of the fuel tank thoroughly draws all fuel from a lowermost bottom of the fuel tank.

In one embodiment, the crankcase comprises an upper casing and a lower casing fixed to the rear portion of the main pipe. With both the upper and lower casings fixed to the rear portion of the main pipe the crankcase is stably fixed to the main pipe.

In one embodiment of the invention, an upper fixing portion and a lower fixing portion fix the crankcase to the rear portion of the main pipe. A center of swinging of the pivot shaft is positioned on an extension of a mating plane of the upper and lower casings, and the upper and lower fixing portions are positioned above and below the mating plane. With such construction, the center of swinging of the pivot shaft projects laterally of the vehicle body but the fixation of the crankcase to the rear portion side of the main pipe does not project laterally of the vehicle body, so that the driver's traveling comfort is improved.

In one embodiment, the engine is a V-type engine having a front cylinder and a rear cylinder. Engine brackets are mounted to the main pipe to extend between and be fixed to the front and rear cylinders. With such construction, the front and rear cylinders are suspended from and mounted to the main pipe through the engine bracket, so that the engine is stably supported on the main pipe.

In one embodiment, a rear exhaust pipe extends rearward and downward from the rear cylinder. The rear cylinder and the rear portion of the main pipe are separate from each other to define a space to which the rear exhaust pipe is exposed. With such construction, conduction of high temperature heat to the fuel tank from the rear exhaust pipe through the main pipe is cut off, enhancing the durability and service life of the fuel tank.

In one embodiment, the curved portion of the rear portion of the main pipe projects forwardly of a straight line extending between the center of swinging of the pivot shaft and the upper fixing portion, and forwardly of a straight line extending between the center of swinging of the pivot shaft and the lower fixing portion. With such construction, the curved portion of the rear portion of the main pipe is enhanced in stiffness to further stably support the engine.

With the saddle-ride type vehicle according to the invention, the rear portion of the main pipe is connected to the crankcase by being curved to go around the pivot shaft forwardly downward from the rear side thereof, thereby enhancing the main pipe in stiffness to stably support the engine and improving the performance and reliability of the saddle-ride type vehicle.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a side view of a motorcycle according to an embodiment of the invention.

FIG. 2 is an enlarged partial side view of a main pipe and an engine of the motorcycle of FIG. 1.

FIG. 3 is an enlarged front view of the main pipes and a fuel tank as viewed in the direction of arrows III-III in FIG. 1.

FIG. 4 is an enlarged partial side view showing of the main pipe and a pivot shaft of FIG. 3.

DETAILED DESCRIPTION OF THE INVENTION

A saddle-ride type vehicle according to an embodiment of the invention is described with reference to FIGS. 1-4. A motorcycle 1 comprises left and right main pipes 10, 10 and an engine 20 as shown in FIGS. 1-3.

Main pipes 10 comprise an intermediate pipe 11 extending above engine 20 in a longitudinal direction and substantially in a horizontal direction, a front pipe 12 welded at an upper end thereof to a front end 11A of intermediate pipe 11 and constituting a front side extending forwardly downwardly of engine 20 from front end 11A, and a rear pipe 13 welded at an upper end thereof to a rear end 11B of intermediate pipe 11 and constituting a rear side extending rearwardly downwardly of engine 20 from the rear end 11B. Front end 11A of intermediate pipe 11 is positioned forwardly of engine brackets 13A, 13B of rear pipe 13.

An engine bracket 12A is protrusively provided on a lower end of front pipe 12 and a front cylinder 22 is fixed to engine bracket 12A. An engine bracket 11C is provided on a longitudinally intermediate portion of intermediate pipe 11. Engine bracket 11C is suspended and extended between front cylinder 22 and a rear cylinder 23 of engine 20 from intermediate pipe 11, and a lower end thereof separates in a bifurcated manner. Front cylinder 22 and rear cylinder 23 are fixed to a lower end of engine bracket 11C.

Rear pipe 13 is formed as a curved portion 13E to go around a pivot shaft 41 forwardly downward from a rear side thereof to extend downward in an arcuate manner as shown in FIGS. 1 and 2. Upper engine bracket 13A as an upper fixing portion and lower engine bracket 13B as a lower fixing portion are protrusively provided on curved portion 13E of rear pipe 13 and are vertically separated from each other. An upper casing 21A and a lower casing 21B of engine 20 are fixed (connected), respectively to upper engine bracket 13A and lower engine bracket 13B. A center of swinging of pivot shaft 41 is positioned on an extension of a mating plane L of upper casing 21A and lower casing 21B as shown in FIG. 2, Upper engine bracket 13A and lower engine bracket 13B are positioned, respectively, above and below mating plane L. Also, curved portion 13E of rear pipe 13 is arranged in a manner to overlap a front portion 30A of a fuel tank 30 positioned rearwardly of engine 20. An upper portion 13C of rear pipe 13 is relatively small in width while a lower portion 13D is relatively large in width, as viewed in side view.

An interval between rear pipes 13, 13 (see FIG. 3) positioned on lower sides of left main pipe 10 and right main pipe 10 is relatively wide, and an interval between intermediate pipes 11, 11 (only one of them being shown in FIG. 2) positioned on upper sides thereof is relatively small. Fuel tank 30 is arranged between upper portions 13C, 13C of rear pipes 13, 13. Engine 20, indicated by two-dot chain lines in FIG. 3, is arranged between lower portions 13D, 13D of rear pipes 13, 13.

A front end of a swing arm 40 is connected to and supported on lower portion 13D of rear pipe 13 through pivot shaft 41 to be able to swing. A rear end of swing arm 40 is connected to a rotating shaft of a rear wheel 60 to be rotatable.

A seat rail 24 is bolted to main pipe 10 to extend rearwardly of upper portion 13C of rear pipe 13. A back stay 25 is bolted to lower portion 13D of rear pipe 13 to extend curvilinearly rearward and obliquely upward. An upper end of back stay 25 is bolted to an intermediate portion of seat rail 24. A shock absorber 26 is provided between the upper end of back stay 25 and the rear end of swing arm 40.

A head pipe 14 is welded to a front end of intermediate pipe 11 and a rotating shaft 15 provided on a handle is inserted rotatably into head pipe 14. Rotating shaft 15 is fixed to a longitudinally intermediate portion of an under-bracket 16 extending in a left and right direction. Upper ends of left and right front forks 17 (only one of them being shown in the figure) are inserted into and fixed to both left and right sides of under-bracket 16. A front wheel 50 is connected rotatably to lower ends of front forks 17.

Engine 20 is a so-called V-type 4 cylinder engine comprising a crankcase 21 divided vertically into two halves, that is, upper casing 21A and lower casing 21B. Left and right front cylinders 22 (only one of them being shown in the figure) extend upward and obliquely forward from an upper front side of upper casing 21A, and left and right rear cylinders 23 positioned on a rear side of front cylinders 22 extend upward and obliquely rearward from an upper portion of lower casing 21B. Engine 20 is suspended from and mounted to main pipe 10 through engine brackets 11C, 12A, 13A and 13B.

A fuel pump 31 is arranged on a front side of fuel tank 30 in the vicinity of upper portions 13C of rear pipes 13 to supply fuel to engine 20. An air cleaner 70 is arranged above intermediate pipes 11. A battery 80 is arranged above intermediate pipes 11 between air cleaner 70 and fuel tank 30. An upper radiator 90 and a lower radiator 91 are arranged between engine 20 and front wheel 50. Upper radiator 90 is fixed to, for example, front pipes 12 and lower radiator 91 is fixed to crankcase 21.

Front exhaust pipes 32 are connected to front cylinders 22 and rear exhaust pipe 33 are connected to rear cylinders 23. Rear exhaust pipes 33 extend rearwardly and downwardly of rear cylinders 23 and their lower end sides are connected to a muffler 34 together with front exhaust pipes 32. Rear cylinders 23 and rear pipes 13 are arranged away from each other and rear exhaust pipes 33 are exposed to a space S defined between rear cylinders 23 and rear pipes 13.

As shown in FIG. 4, curved portion 13E of rear pipe 13 is formed to project forwardly of a straight line L1, which extends between the center of swinging of pivot shaft 41 and engine bracket 13A, and a straight line L2, which extends between the center of swinging of pivot shaft 41 and engine bracket 13B.

A heel guard 35 is mounted to curved portion 13E of rear pipe 13 around pivot shaft 41. Heel guard 35 prevents a driver from directly striking against rear pipe 13 when putting a foot on a foot rest 37. A foot bracket 36, separate from heel guard 35, is mounted to curved portion 13E below and away from heel guard 35. Foot rest 37, on which a driver puts a foot, is provided at a front end of foot bracket 36. As shown in FIG. 2, a thermal insulation plate 38 is arranged between fuel tank 30 and rear exhaust pipes 33 to cut off conduction of high temperature heat to fuel tank 30, etc. from rear exhaust pipes 33.

According to this embodiment, rear pipe 13 positioned on a rear side of main pipe 10 is arcuately curved. Therefore, when rear pipe 13 is connected to crankcase 21, a load from engine 20 is not locally centered on the bent portion of the main pipe, as in the conventional art, but instead is uniformly applied to the whole main pipes 10, and the main pipes are thereby enhanced in stiffness.

Rear pipe 13 is formed with curved portion 13E to go around pivot shaft 41 forwardly downward from the rear side thereof, and crankcase 21 is connected to curved portion 13E. Therefore, in contrast with the conventional art where the rear pipe is extended straight to be directed substantially vertically downward from the rear end of the front pipe to be connected to, the crankcase, a load transmitted to main pipes 10 rearward from engine 20 is surely born by rear pipes 13. Therefore, main pipes 10 are enhanced in stiffness and motorcycle 1 is improved in performance and reliability.

Since curved portions 13E overlap front portion 30A of fuel tank 30, main pipes 10 can protect fuel tank 30 from shocks or the like from outside to enhance fuel tank 30 in durability and service life.

Since the interval between left and right intermediate pipes 11 positioned on upper sides of left and right main pipes 10 is relatively small in width, traveling comfort is improved. Since the interval between left and right rear pipes 13 positioned on lower sides of left and right main pipes 10 is relatively large in width, a fairly large space is ensured to accommodate fuel tank 30.

Since heel guard 35 and foot bracket 36 are provided on main pipe 10 independent (separate) from each other, foot rest 37 mounted to foot bracket 36 can be arranged close to the center of the vehicle so that a driver can easily put a foot on foot rest 37, in contrast to the case where heel guard 35 and foot bracket 36 are integral with each other.

The invention has been described with motorcycle 1 as one example of a saddle-ride type vehicle. However, the invention is not limited thereto and may be applied to other saddle-ride type vehicles such as three-wheelers, buggies, etc.

The particular embodiments of the invention described in this document should be considered illustrative, rather than restrictive. Modification to the described embodiments may be made without departing from the spirit of the invention as defined by the following claims.

The invention claimed is:

1. A saddle-ride type vehicle comprising:
a main pipe including a front portion extending forward and downward and a rear portion extending rearward and downward,
a swing arm connected to and supported on the rear portion of the main pipe through a pivot shaft to be able to swing,
an engine mounted to at least the front portion and the rear portion of the main pipe,
wherein the rear portion of the main pipe comprises a curved portion extending rearwardly of the pivot shaft and curving around the pivot shaft to further extend forward and downward thereof, and wherein a crankcase of the engine is connected to the curved portion of the rear portion of the main pipe,
a fuel tank arranged rearwardly of the engine and overlapping the curved portion of the rear portion of the main pipe at least partially as viewed from a side view, and
a fuel pump arranged on a front portion of the fuel tank.

2. A saddle-ride type vehicle comprising:
a main pipe including a front portion extending forward and downward and a rear portion extending rearward and downward,
a swing arm connected to and supported on the rear portion of the main pipe through a pivot shaft to be able to swing, and
an engine mounted to at least the front portion and the rear portion of the main pipe,
wherein the rear portion of the main pipe comprises a curved portion extending rearwardly of the pivot shaft and curving around the pivot shaft to further extend forward and downward thereof,
wherein a crankcase of the engine is connected to the curved portion of the rear portion of the main pipe, and
wherein the crankcase comprises an upper casing and a lower casing that are fixed to the rear portion of the main pipe.

3. The saddle-ride type vehicle according to claim 2, further comprising an upper fixing portion and a lower fixing portion for fixing the crankcase to the rear portion of the main pipe, and
wherein a center of swinging of the pivot shaft is positioned on an extension of a mating plane of the upper casing and the lower casing, and the upper fixing portion and the lower fixing portion are positioned above and below the mating plane.

4. The saddle-ride type vehicle according to claim 3, wherein the curved portion of the rear portion of the main pipe projects forwardly of a straight line extending between the center of swinging of the pivot shaft and the upper fixing portion, and forwardly of a straight line extending between the center of swinging of the pivot shaft and the lower fixing portion.

5. A saddle-ride type vehicle comprising:
a main pipe including a front portion extending forward and downward and a rear portion extending rearward and downward,
a swing arm connected to and supported on the rear portion of the main pipe through a pivot shaft to be able to swing, and
an engine mounted to at least the front portion and the rear portion of the main pipe,
wherein the rear portion of the main pipe comprises a curved portion extending rearwardly of the pivot shaft and curving around the pivot shaft to further extend forward and downward thereof,
wherein a crankcase of the engine is connected to the curved portion of the rear portion of the main pipe, and
wherein the engine is a V-type engine having a front cylinder and a rear cylinder, and engine brackets are mounted to the main pipe to extend between and be fixed to the front and rear cylinders.

6. The saddle-ride type vehicle according to claim 5, further comprising a rear exhaust pipe extending rearward and downward from the rear cylinder, and
wherein the rear cylinder and the rear portion of the main pipe are separate from each other to define a space to which the rear exhaust pipe is exposed.

* * * * *